US010309826B2

(12) United States Patent
Mizusaki et al.

(10) Patent No.: US 10,309,826 B2
(45) Date of Patent: Jun. 4, 2019

(54) SENSOR DEVICE AND METHOD OF PRODUCING THE SAME

(71) Applicant: OMRON CORPORATION, Kyoto-shi, Kyoto (JP)

(72) Inventors: Hiroyuki Mizusaki, Fukuchiyama (JP); Hirotaka Nakashima, Fukuchiyama (JP)

(73) Assignee: OMRON CORPORATION, Kyoto-shi, Kyoto (JP)

( * ) Notice: Subject to any disclaimer, the term of this patent is extended or adjusted under 35 U.S.C. 154(b) by 121 days.

(21) Appl. No.: 15/391,141

(22) Filed: Dec. 27, 2016

(65) Prior Publication Data

US 2017/0254698 A1 Sep. 7, 2017

(30) Foreign Application Priority Data

Mar. 3, 2016 (JP) ................. 2016-041599

(51) Int. Cl.
| | | |
|---|---|---|
| G01J 1/02 | (2006.01) | |
| B23K 26/082 | (2014.01) | |
| B23K 26/26 | (2014.01) | |
| B23K 26/20 | (2014.01) | |
| B23K 33/00 | (2006.01) | |
| H01H 11/00 | (2006.01) | |
| H01H 35/00 | (2006.01) | |

(Continued)

(52) U.S. Cl.
CPC .......... *G01J 1/0271* (2013.01); *B23K 26/082* (2015.10); *B23K 26/206* (2013.01); *B23K 26/244* (2015.10); *B23K 26/26* (2013.01); *B23K 33/004* (2013.01); *H01H 11/00* (2013.01); *H01H 35/00* (2013.01); *B23K 2101/12* (2018.08); *B23K 2101/36* (2018.08); *B23K 2103/05* (2018.08)

(58) Field of Classification Search
CPC ..... G01J 1/0271; B23K 26/082; B23K 26/26; B23K 26/244; B23K 26/206; B23K 33/004; B23K 2203/05; B23K 2201/36; B23K 2201/12; H01H 35/00; H01H 11/00
See application file for complete search history.

(56) References Cited

U.S. PATENT DOCUMENTS

| 5,879,416 A | 3/1999 | Nakamura et al. |
| 5,893,959 A | 4/1999 | Muellich |

FOREIGN PATENT DOCUMENTS

| CN | 102316689 A | 1/2012 |
| CN | 102928650 A | 2/2013 |

(Continued)

OTHER PUBLICATIONS

Communication dated Jul. 25, 2017, from the European Patent Office in counterpart European Application No. 16206553.6.

(Continued)

*Primary Examiner* — Tony Ko
(74) *Attorney, Agent, or Firm* — Sughrue Mion, PLLC

(57) ABSTRACT

A sensor device includes a body case provided with an opening, and a body cover assembled to the body case to cover the opening. The body cover has at an outer peripheral portion thereof an overlapping region overlapping a portion of the body case located at a peripheral edge of the opening. The body cover is fixed to the body case by providing a welded portion surrounding the opening using laser-welding at a portion distant from an end surface of the body cover in a boundary of the overlapping region of the body cover and a portion of the body case overlapping the overlapping region.

4 Claims, 8 Drawing Sheets

(51) Int. Cl.
*B23K 26/244* (2014.01)
*B23K 101/36* (2006.01)
*B23K 101/12* (2006.01)
*B23K 103/04* (2006.01)

(56) References Cited

FOREIGN PATENT DOCUMENTS

| | | |
|---|---|---|
| JP | 2009-170133 A | 7/2009 |
| JP | 2011105005 A | 6/2011 |
| JP | 2011216372 A | 10/2011 |

OTHER PUBLICATIONS

Communication dated Jul. 31, 2018, issued by the Japan Patent Office in corresponding Japanese Application No. 2016-041599.
Communication dated Mar. 18, 2019 by the Intellectual Property Office of the P.R.C. In application No. 201611242212.6.

SENSOR DEVICE AND METHOD OF PRODUCING THE SAME

BACKGROUND OF THE INVENTION

Field of the Invention

The present invention relates to a sensor device represented by a photoelectric sensor and a method of producing the same.

Description of the Background Art

A sensor device represented by a photoelectric sensor has various components accommodated inside a casing. In that case, there is a case in which an assembly structure is adopted such that the casing is composed of a body case in the form of a box and a body cover in the form of a flat plate, and the various components are accommodated inside the body case via an opening provided through the body case and subsequently the body cover is assembled to the body case to cover the opening. Note that when this assembly structure is adopted, then, in order to seal a space in the casing from outside to ensure resistance to an environment, the body case and the body cover are often welded and thus bonded together.

For example, Japanese Patent Laying-Open No. 2009-170133 discloses a photoelectric sensor in which a body case has a side surface provided with an opening, a step is further provided at a portion of the body case located at a peripheral edge of that opening, a body cover is fitted to the step, and a laser beam is radiated along an outer periphery of the body cover to straddle an end surface of the body cover and an end surface of the above step of the body case to weld and thus bond the body case and the body cover together.

When this assembly structure is adopted, the end surface of the body cover and the end surface of the above step of the body case opposite thereto mutually melt together so that an externally molten metallic material fills a gap between these end surfaces and furthermore, the material is cooled and thus solidified to form a welded portion at a position close to the end surface of the body cover.

When the above assembly structure is adopted, it is necessary to radiate a laser beam to straddle the end surface of the body cover and the end surface of the above step of the body case, as has been described above, and accordingly, when the precision of the body cover and body case as parts is taken into consideration, it is necessary to make the laser beam's spot diameter large to a corresponding extent.

However, when the laser beam's spot diameter is thus made large, then, unless the laser beam's power is accordingly increased, causing the metallic material to be externally molten is not ensured, and accordingly, not only is large-scale laser equipment required but the laser beam's irradiation would also significantly increase the casing's temperature, and as a result there is also a possibility that there may be a negative effect on a component e.g., of resin, rubber, etc. previously assembled to the casing.

In order to solve this, it is necessary to strictly manage the body case and the body cover in precision as parts, and also suppress an increase in temperature of the casing by using various heat dissipating jigs, and furthermore, carefully perform laser irradiation under a strict condition. This serves as a cause of a significantly tightened production cost.

SUMMARY OF INVENTION

The present invention has been made in view of the above problems and an object thereof is to provide a sensor device that can reduce a production cost and also ensures that a body case and a body cover are bonded together, and a method of producing the sensor device.

A sensor device based on the present invention comprises a body case provided with an opening, and a body cover assembled to the body case to cover the opening. The body cover has at an outer peripheral portion thereof an overlapping region overlapping a portion of the body case located at a peripheral edge of the opening. In the sensor device based on the present invention, the body cover is fixed to the body case by providing a welded portion surrounding the opening using laser-welding at a portion distant from an end surface of the body cover in a boundary of the overlapping region of the body cover and a portion of the body case overlapping the overlapping region.

By this configuration, without the necessity of severely managing the body case and the body cover in precision as parts, the body cover can be fixed to the body case with a good yield. Thus a sensor device can be provided which can reduce a production cost and also ensures that the body case and the body cover are bonded together.

In the sensor device based on the present invention, it is preferable that a step be further provided at a portion of the body case located at a peripheral edge of that opening and in that case, it is preferable that the body cover be fitted to the step.

By this configuration, a step between the body case and the body cover can be reduced and an aesthetical appearance is ensured, and positioning the body cover relative to the body case can also be easily done.

In the sensor device based on the present invention, it is preferable that when the opening is observed in a direction along a normal to its opening plane, the step have an outer shape of a polygon larger than a shape of the body cover, and in that case, it is preferable that at two adjacent sides of the step having the outer shape of the polygon, an end surface of the step abut against the end surface of the body cover.

By this configuration, positioning the body cover relative to the body case can be easily done.

In the sensor device based on the present invention, it is preferable that the welded portion be provided at a portion distant outward from the opening in the boundary of the overlapping region of the body cover and the portion of the body case overlapping the overlapping region.

By this configuration, a thermal effect on an internal component in forming the welded portion can be reduced, and the body cover can be fixed to the body case with a good yield.

A method of producing a sensor device, comprises: disposing a body cover on a body case to cover an opening of the body case and also allow the body cover to have an outer peripheral portion overlapping a portion of the body case located at a peripheral edge of the opening; and fixing the body cover to the body case by providing a welded portion surrounding the opening so as to bond the body case and the body cover using laser-welding by way of scanning a laser beam along the opening to irradiate therewith a portion distant inward from an end surface of the body cover in a boundary of an overlapping region of the body cover overlapping the portion of the body case located at the peripheral edge of the opening and a portion of the body case overlapping the overlapping region.

By producing a sensor device in accordance with such a production method, without the necessity of severely managing the body case and the body cover in precision as parts, and without the necessity of severely managing a laser irradiation condition more than necessary in laser-welding, the body cover can be fixed to the body case with a good yield. Thus a method of producing a sensor device can be provided which can reduce a production cost and also ensures that the body case and the body cover are bonded together.

In the method of producing a sensor device based on the present invention, it is preferable that in disposing the body cover on the body case, the body cover be fit to a step provided at a portion of the body case located at the peripheral edge of the opening.

By producing a sensor device in accordance with such a production method, a step between the body case and the body cover can be reduced and an aesthetical appearance is ensured, and positioning the body cover relative to the body case can also be easily done.

In the method of producing a sensor device based on the present invention, it is preferable that in disposing the body cover on the body case, when the opening is observed in a direction along a normal to its opening plane, at two adjacent sides of the step, which has an outer shape of a polygon larger than a shape of the body cover, an end surface of the body cover be abutted against an end surface of the step to position the body cover relative to the body case.

By producing a sensor device in accordance with such a production method, positioning the body cover relative to the body case can be easily done.

In the method of producing a sensor device based on the present invention, it is preferable that in fixing the body cover to the body case, the laser beam is scanned to thus irradiate therewith a portion distant outward from the opening in the boundary of the overlapping region of the body cover and the portion of the body case overlapping the overlapping region.

By producing a sensor device in accordance with such a production method, a thermal effect on an internal component in forming the welded portion can be reduced, and the body cover can be fixed to the body case with a good yield.

The present invention can thus provide a sensor device which can reduce a production cost and also ensures that the body case and the body cover are bonded together, and a method of producing the sensor device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will now be described hereinafter in detail with reference to drawings. An embodiment indicated hereinafter will be described by indicating as an example a case where the present invention is applied to a reflection type photoelectric sensor serving as a sensor device. In the following embodiment, identical or common components are identically denoted in the figures and will not be described repeatedly.

Figure 1:
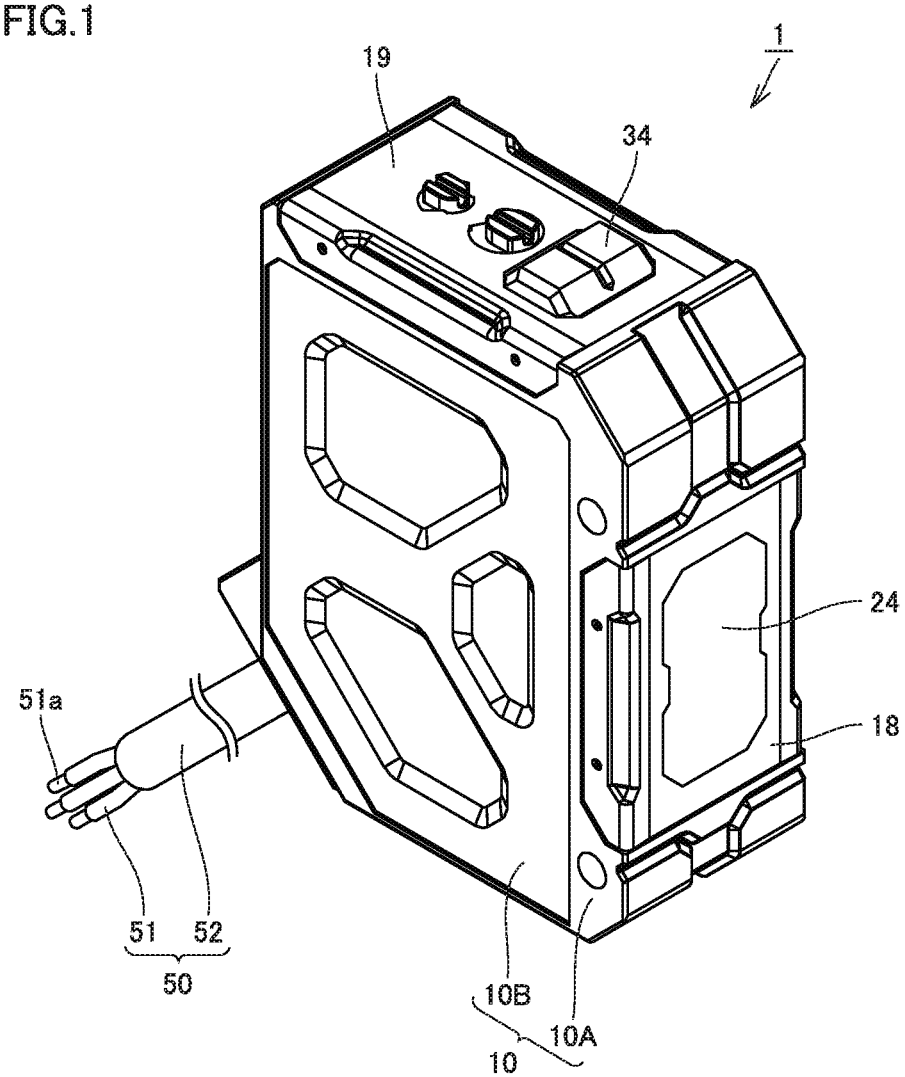
FIG. 1 is a perspective view of a photoelectric sensor in an embodiment of the present invention, as seen from a front side.
Figure 2:
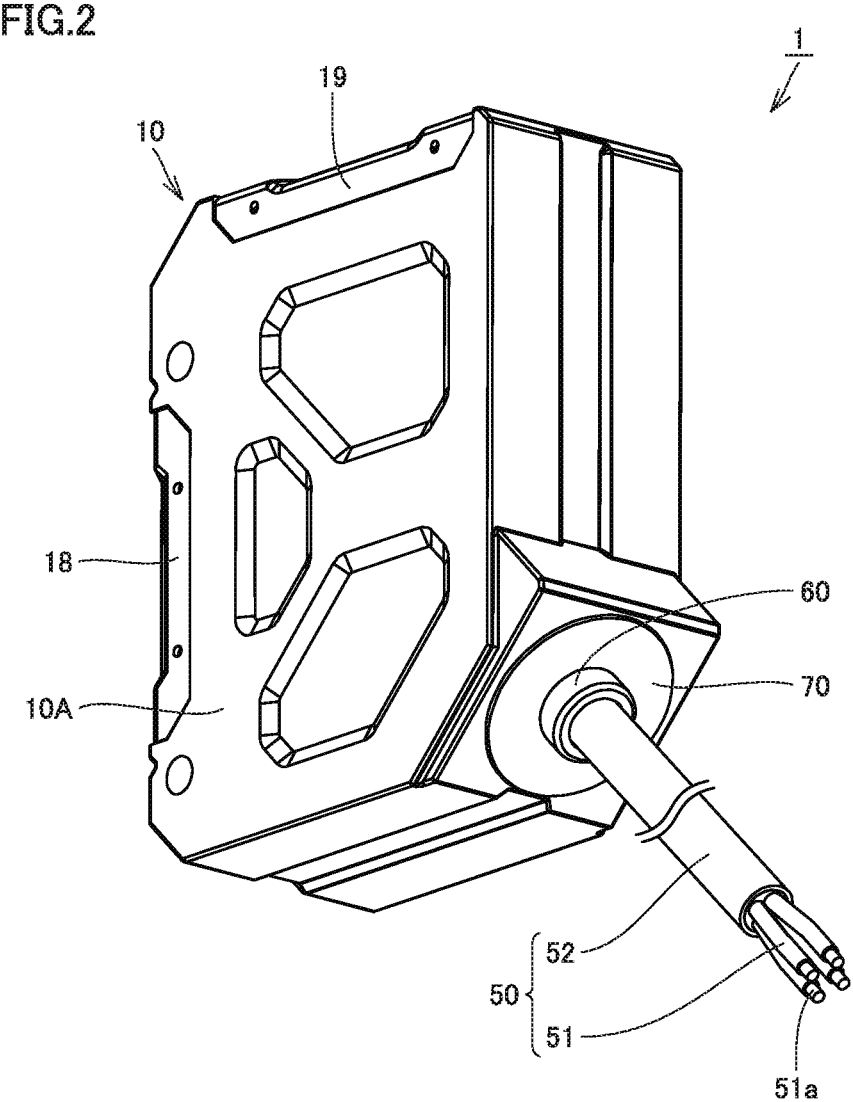
FIG. 2 is a perspective view of the photoelectric sensor shown in FIG. 1, as seen from a back side.
Figure 3:
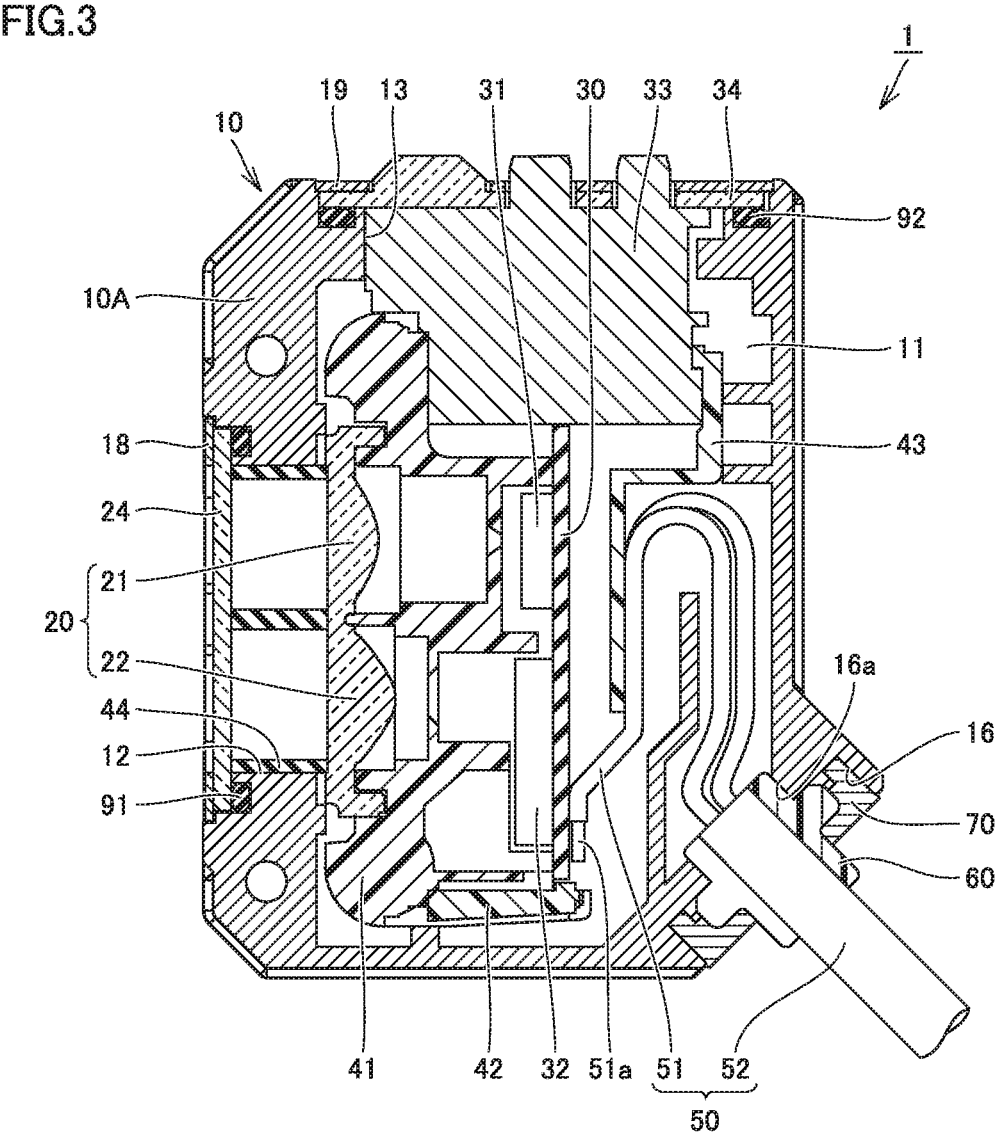
FIG. 3 is a schematic cross section of the photoelectric sensor shown in FIG. 1.
Figure 4:
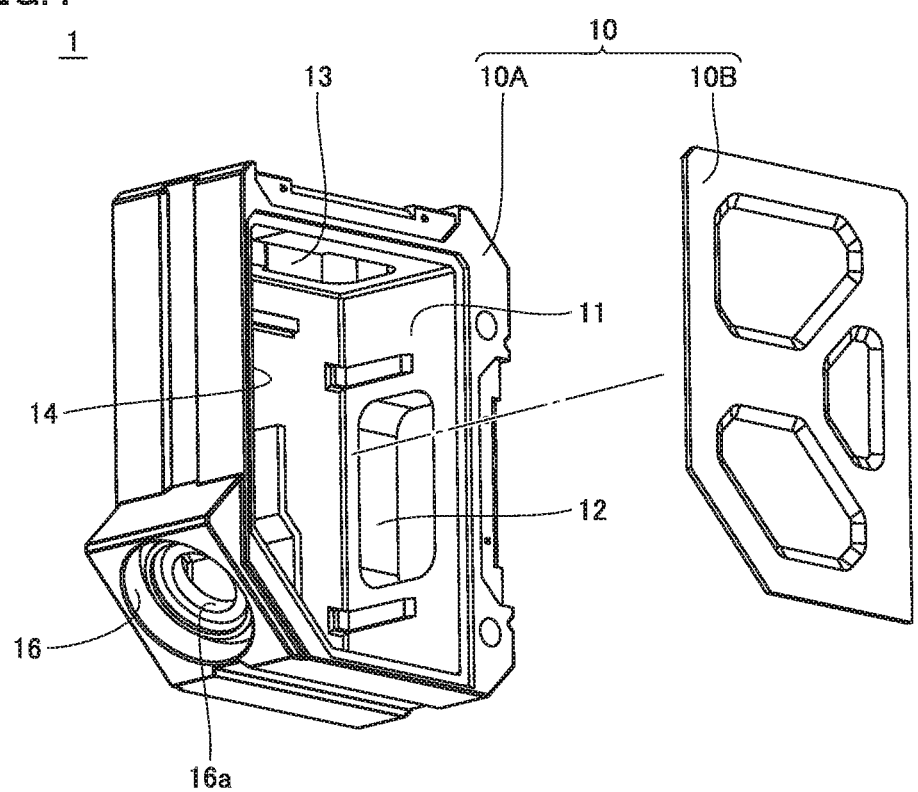
FIG. 4 is an exploded perspective view of a main portion of the photoelectric sensor shown in FIG. 1.

FIG. 1 is a perspective view of a photoelectric sensor in an embodiment of the present invention, as seen from a front side, and FIG. 2 is a perspective view of the photoelectric sensor shown in FIG. 1, as seen from a back side. Furthermore, FIG. 3 is a schematic cross section of the photoelectric sensor shown in FIG. 1, and FIG. 4 is an exploded perspective view of a main portion of the photoelectric sensor shown in FIG. 1. Initially, with reference to FIG. 1 to FIG. 4, a schematic configuration of a photoelectric sensor 1 in the present embodiment will be described.

As shown in FIG. 1 to FIG. 4, photoelectric sensor 1 is generally shaped substantially in the form of a rectangular parallelepiped, and mainly includes a casing 10, a lens member 20, a transmissive plate 24, a light projecting and receiving circuit board 30 on which a light projecting element 31 and a light receiving element 32 are mounted, a display and operation unit 33, a displaying transmissive member 34, various brackets 41-43, a cable 50, a bush 60, and a fixing member 70.

Casing 10 includes a body case 10A in the form of a box and a body cover 10B in the form of a flat plate. Body case 10A mainly configures the front surface, rear surface, upper surface, lower surface, and right side surface of photoelectric sensor 1, and body cover 10B configures a portion of the left side surface of photoelectric sensor 1. Note that the front surface is a surface where transmissive plate 24 is assembled, and the rear surface is a surface opposite to the front surface. Furthermore, the upper surface is a surface where display and operation unit 33 is assembled, and the lower surface is a surface opposite to the upper surface.

Body case 10A and body cover 10B are metallic members for example, and are suitably members made of stainless steel. Body case 10A is produced by metal injection molding (MIM) for example, and body cover 10B is produced by press-working a metal plate for example.

As shown in FIG. 4, a side surface opening 14 is provided at a portion corresponding to a left side surface of body case 10A, and body cover 10B is assembled to cover side surface opening 14. Body cover 10B has its peripheral edge entirely laser-welded and thus fixed to body case 10A. Note that photoelectric sensor 1 in the present embodiment is characterized in bonding body case 10A and body cover 10B together, which will be described later in detail.

Thus, an accommodation space 11 is formed inside casing 10 composed of body case 10A and body cover 10B, and various internal components such as lens member 20, light projecting and receiving circuit board 30, display and operation unit 33, brackets 41-43 etc. are accommodated in accommodation space 11. Note that side surface opening 14 is an opening for assembling the above described various internal components to an interior of body case 10A. Note the photoelectric sensor can be established without display and operation unit 33.

As shown in FIG. 3 and FIG. 4, a front surface opening 12 is provided at a prescribed position through the front surface of body case 10A. As shown in FIG. 1 and FIG. 3, front surface opening 12 is covered with transmissive plate 24, and a cover 18 for the transmissive plate is assembled to body case 10A to further cover transmissive plate 24.

For example, cover 18 for the transmissive plate is a metallic member having a window at that prescribed position and is suitably a member made of stainless steel. Cover 18 for the transmissive plate is produced by press-working a metal plate for example.

An O ring 91 is disposed between transmissive plate 24 and body case 10A, and in that condition when cover 18 for the transmissive plate is assembled to body case 10A a gap between transmissive plate 24 and body case 10A is filled with O ring 91. Thus, at a portion of body case 10A provided with front surface opening 12, accommodation space 11 located inside casing 10 is sealed from a space external to casing 10. Note that cover 18 for the transmissive plate is fixed to body case 10A by laser welding, for example.

As shown in FIG. 3 and FIG. 4, an upper surface opening 13 is provided at a prescribed position through the upper surface of body case 10A. As shown in FIG. 1 and FIG. 3, display and operation unit 33 is located in accommodation space 11 at a portion which faces upper surface opening 13, and display and operation unit 33 and upper surface opening 13 are covered with displaying transmissive member 34. Furthermore, a cover 19 for the display and operation unit is assembled to body case 10A to cover displaying transmissive member 34.

For example, cover 19 for the display and operation unit is a metallic member having a window and a hole at that prescribed position and is suitably a member made of stainless steel. Cover 19 for the display and operation unit is produced by press-working a metal plate for example.

An O ring 92 is disposed between displaying transmissive member 34 and body case 10A, and in that condition when cover 19 for the display and operation unit is assembled to body case 10A a gap between displaying transmissive member 34 and body case 10A is filled with O ring 92. Thus, at a portion of body case 10A provided with upper surface opening 13, accommodation space 11 located inside casing 10 is sealed from a space external to casing 10. Note that cover 19 for the display and operation unit is fixed to body case 10A by laser welding, for example.

Display and operation unit 33 includes a display unit composed of a light emitting diode (LED) etc., an operation unit including a sensitivity adjusting volume, an operation selector switch, etc., and a display and operation circuit board on which various electronic components configuring the display unit and the operation unit are mounted. The display and operation circuit board is electrically connected to light projecting and receiving circuit board 30 via a wiring etc. (not shown). Note that displaying transmissive member 34 is a member for diffusing light emitted from the display unit so that the light is externally, visually observable.

As shown in FIG. 3, in accommodation space 11 serving as a space in casing 10, at a position behind front surface opening 12, lens member 20 is disposed, and furthermore, at a position behind lens member 20, light projecting and receiving circuit board 30 is disposed. Furthermore, in front surface opening 12 at a portion located between lens member 20 and transmissive plate 24, a spacer 44 is disposed for maintaining a distance therebetween.

Light projecting and receiving circuit board 30 has a major surface facing lens member 20 and having an upper portion with light projecting element 31 which is for example a semiconductor light emitting diode, a semiconductor laser diode (LD), etc. mounted, and a lower portion with light receiving element 32 which is for example a semiconductor photodiode (PD) etc. mounted.

A portion of lens member 20 opposite to light projecting element 31 is provided with a light projecting lens 21, and a portion of lens member 20 opposite to light receiving element 32 is provided with a light receiving lens 22.

Thus, in photoelectric sensor 1, light emitted from light projecting element 31 is radiated to a space outside photoelectric sensor 1 via light projecting lens 21 and transmissive plate 24, and a reflection of the light is sensed by light receiving element 32 via transmissive plate 24 and light receiving lens 22.

Note that lens member 20, light projecting and receiving circuit board 30, and display and operation unit 33 are held in accommodation space 11 by various brackets 41-43 etc. assembled to an interior of casing 10.

Light projecting and receiving circuit board 30 has front and back surfaces with an electrically conductive pattern formed thereon, and has, in addition to light projecting element 31 and light receiving element 32, various electronic components mounted thereon. Thus, light projecting and receiving circuit board 30 is provided with various electrical circuits. The electrical circuits include a drive circuit for driving light projecting element 31, a signal processing circuit which photoelectrically converts the light that is sensed by light receiving element 32 into a prescribed output signal, a power supply circuit which receives externally supplied power, converts it to a prescribed power supply specification, and externally outputs it, etc. for example.

Light projecting and receiving circuit board 30 at a prescribed position closer to a lower end thereof is provided with a land to which an electrically conductive line 51a included in a core wire 51 of cable 50 described later is connected (not shown). The land and electrically conductive line 51a of cable 50 are connected together for example by soldering, and cable 50 is thus electrically connected to the above described various electrical circuits.

As shown in FIG. 1 to FIG. 3, cable 50 is composed of a composite cable composed of core wire 51 including electrically conductive line 51a and a sheath 52 which covers core wire 51. Note that cable 50 may further include a shielding material covering core wire 51 and also covered with sheath 52. Note that sheath 52 is made of resin for example, and more suitably, composed of any of polyvinyl chloride (PVC) resin, polyurethane (PUR) resin and fluororesin.

As shown in FIG. 3 and FIG. 4, a recess 16 is provided at an external surface of body case 10A configuring a position on the side of a rear and lower surface of casing 10. Recess 16 has a bottom surface provided with a cable inserting opening 16a in communication with accommodation space 11 provided inside casing 10 and a space external to casing 10.

Cable 50 is disposed through cable inserting opening 16a of body case 10A, and has one end drawn into casing 10 and electrically connected to light projecting and receiving circuit board 30 and the other end drawn outside casing 10.

At a prescribed position on cable 50, a cylindrical bush 60 is attached. Bush 60 is a rubber member, and is suitably composed of any of nitrile rubber (NBR), hydrogenated nitrile rubber (HNBR), and fluororubber.

Furthermore, in recess 16 of body case 10A, fixing member 70 in an annular form is fitted to thus fix cable 50 to casing 10. Fixing member 70 is a metallic member for example, and is suitably composed of brass.

Note that bush 60 is attached to cable 50, and in that condition, together with cable 50, press-fitted into cable inserting opening 16a, and furthermore, fixing member 70 is press-fitted into recess 16 to compress bush 60. Thus, fixing member 70 cooperates with cable 50 to sandwich bush 60, and also cooperates with the bottom surface of recess 16 to sandwich bush 60.

Thus at these portions bush 60 closely contacts cable 50 and body case 10A and thus at those portions accommodation space 11 located inside casing 10 is sealed from a space external to casing 10.

Figure 5:
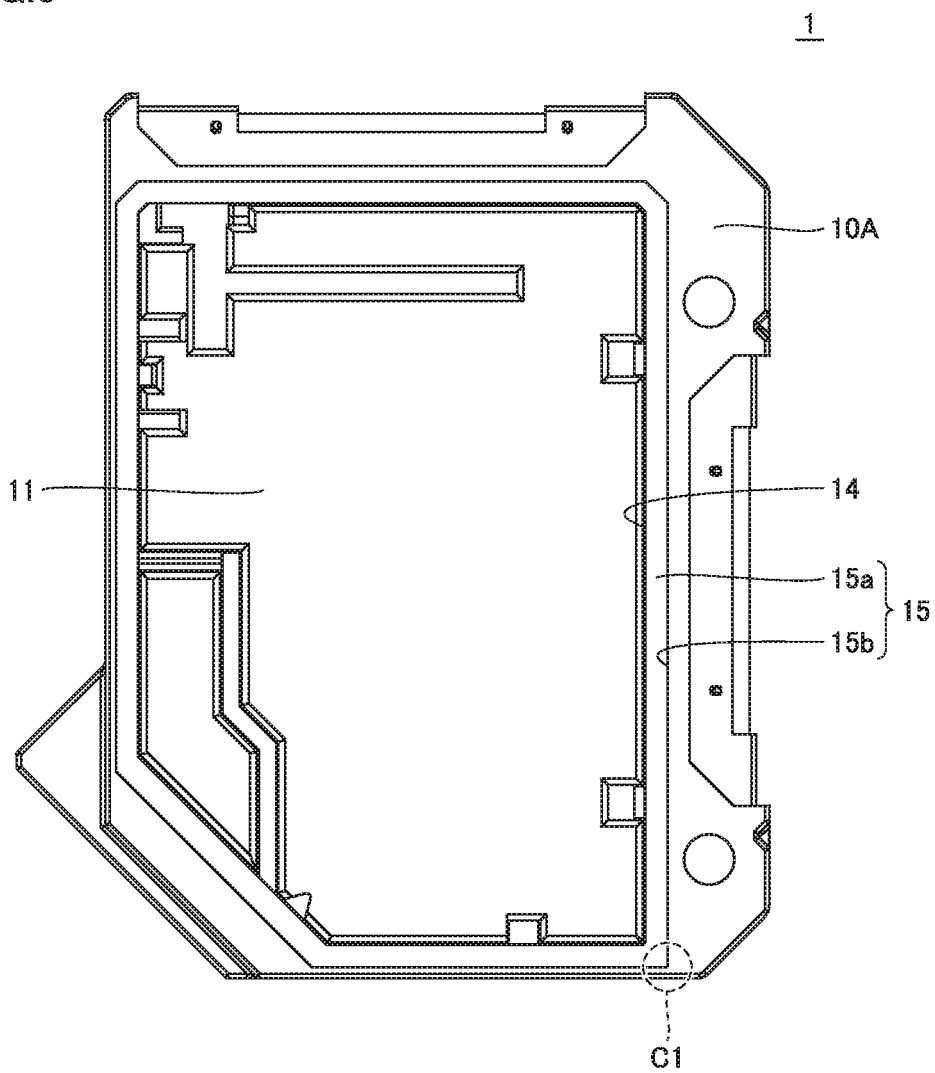
FIG. 5 is a left side view of a body case of the photoelectric sensor shown in FIG. 1.
Figure 6:
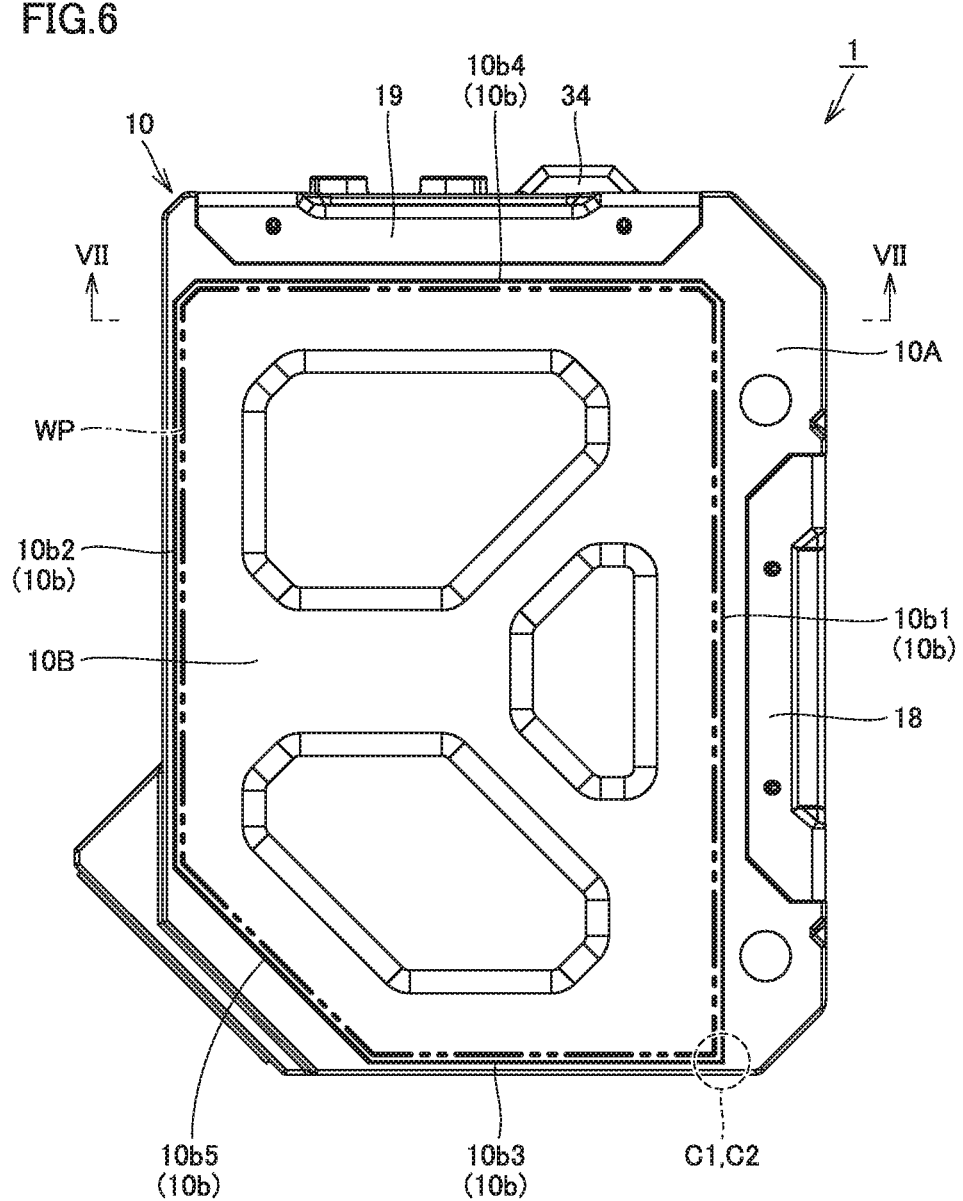
FIG. 6 is a left side view of the photoelectric sensor shown in FIG. 1 showing a position provided with a welded portion.
Figure 7:
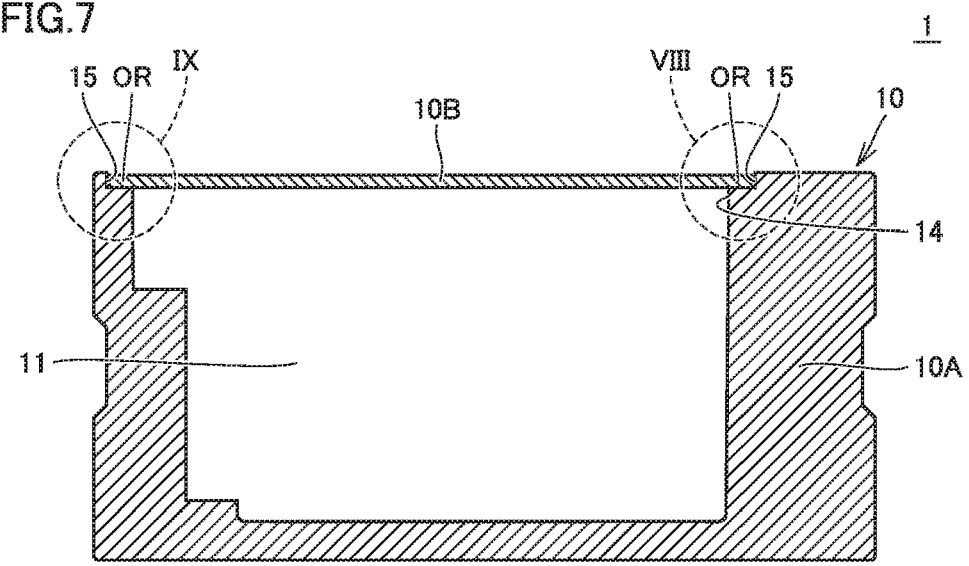
FIG. 7 is a schematic cross section of a casing of the photoelectric sensor shown in FIG. 1 taken along a line VII-VII shown in FIG. 6.
Figure 8:
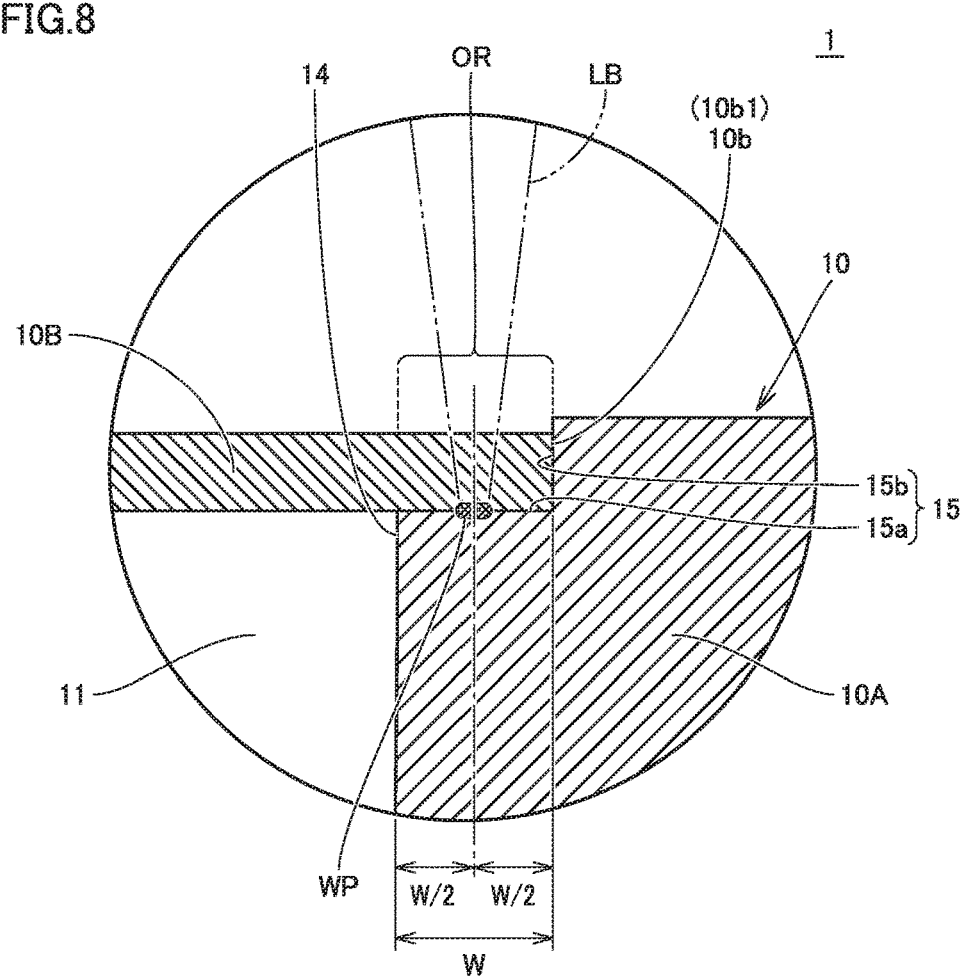
FIG. 8 is an enlarged view of a region VIII shown in FIG. 7.
Figure 9:
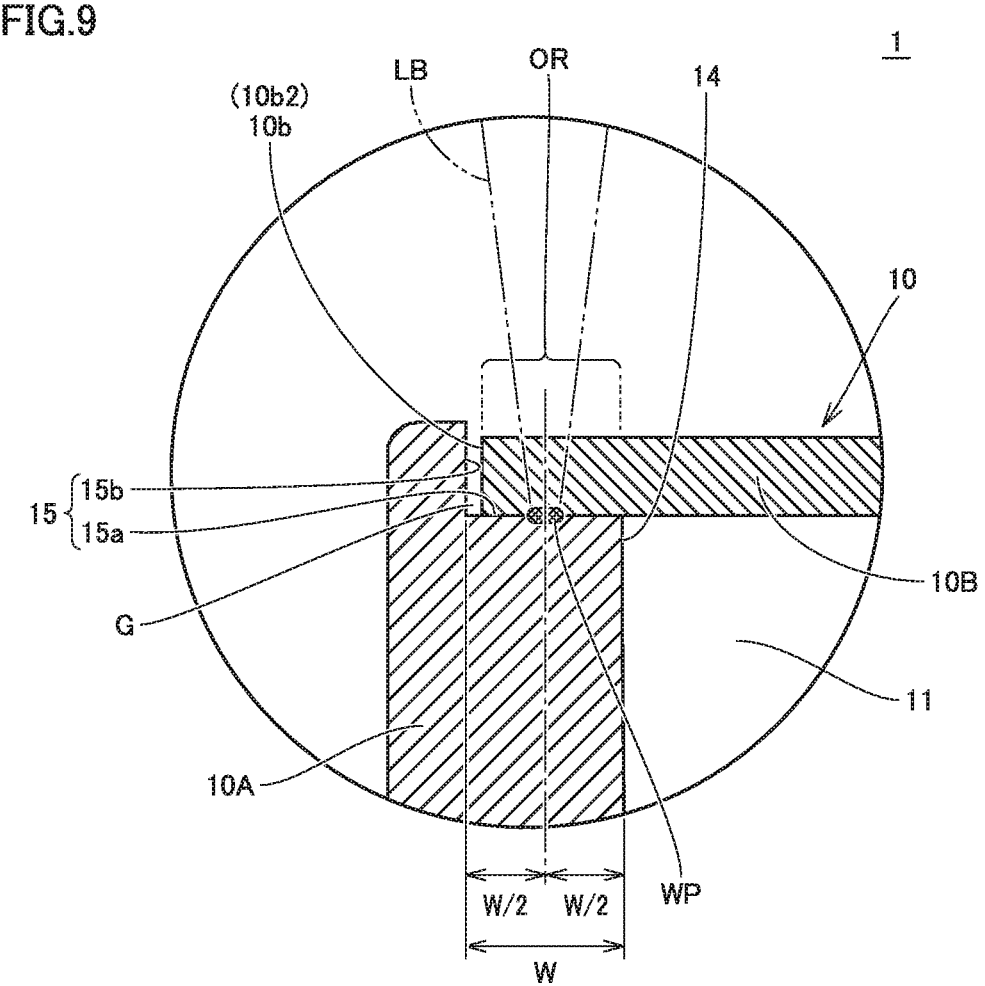
FIG. 9 is an enlarged view of a region IX shown in FIG. 7.

FIG. 5 is a left side view of the body case of the photoelectric sensor shown in FIG. 1 and FIG. 6 is a left side view of the photoelectric sensor shown in FIG. 1 showing a position provided with a welded portion. FIG. 7 is a schematic cross section of the casing of the photoelectric sensor shown in FIG. 1 taken along a line VII-VII shown in FIG. 6. Furthermore, FIG. 8 is an enlarged view of a region VIII shown in FIG. 7 and FIG. 9 is an enlarged view of a region IX shown in FIG. 7. Hereinafter, reference will be made to FIG. 5 to FIG. 9 to describe a structure of photoelectric sensor 1 to assemble body cover 10B to body case 10A in the present embodiment and a method of producing photoelectric sensor 1 in the present embodiment.

With reference to FIG. 5, as has been described above, body case 10A has a left side surface provided with side surface opening 14 for assembling various internal components to an interior of body case 10A. Side surface opening 14 has a larger opening area than another opening provided through body case 10A. Note that it is preferable that when side surface opening 14 is observed in a direction along a normal to its opening plane side surface opening 14 have a polygonal shape and in the present embodiment it has a generally pentagonal shape.

A portion of body case 10A located at a peripheral edge of side surface opening 14 is provided with a step 15 along the entire peripheral edge of side surface opening 14. As shown in FIG. 7 to FIG. 9, step 15 is shaped to recede toward an interior of casing 10 relative to the left side surface of body case 10A, and is defined by a step surface 15a and an end surface 15b immediately adjacent thereto. Note that step surface 15a is a surface corresponding to a bottom surface of step 15, and is located parallel to the left side surface of body case 10A. Furthermore, end surface 15b is a surface corresponding to a side surface of step 15, and is orthogonal to the left side surface of body case 10A.

As shown in FIG. 5, step 15 has an outer shape (i.e., a shape of step 15 defined by end surface 15b when step 15 is seen in a plan view) configured to be a polygon substantially conforming to that of side surface opening 14, and in the present embodiment it has a generally pentagonal shape. Note that a corner C1 of step 15 which is located at a position closer to the front and lower surfaces of casing 10 is configured to be a right angle in a plan view. Corner C1 is used to align body cover 10B with body case 10A, as will be described later.

As shown in FIG. 6, body cover 10B, in a plan view, has a shape configured to be a polygon corresponding to that of step 15, and in the present embodiment it has a generally pentagonal shape. Note that step 15 has a shape configured to be slightly larger than that of body cover 10B, and body cover 10B is thus fitted to step 15, as shown in FIG. 7 to FIG. 9. Note that a corner C2 of body cover 10B which is located at a position closer to the front and lower surfaces of casing 10 is configured to be bent to form a right angle in a plan view. Corner C2 is used together with corner C1 of step 15 to align body cover 10B with body case 10A, as will be described later.

As shown in FIG. 7 to FIG. 9, body cover 10B has an overlapping region OR fitted to step 15 of body case 10A to overlap step surface 15a of step 15. Note that step surface 15a corresponds to a portion of body case 10A located at a peripheral edge of side surface opening 14, and overlapping region OR of body cover 10B is located along step surface 15a to be arranged entirely along an outer peripheral portion of body cover 10B.

At a prescribed position on a boundary of overlapping region OR of body cover 10B and a portion of step surface 15a overlapping overlapping region OR, a welded portion WP is provided to bond body cover 10B and body case 10A together. Welded portion WP is formed by scanning and thus radiating a laser beam LB along the outer peripheral portion of body cover 10B and it is located to surround side surface opening 14, as shown in FIG. 6, FIG. 8, and FIG. 9.

Thus, body cover 10B is fixed to body case 10A via welded portion WP, and welded portion WP disposed to surround side surface opening 14 seals accommodation space 11 inside casing 10 from a space external to casing 10.

In a method of producing photoelectric sensor 1 in the present embodiment, in radiating laser beam LB, as has been described above, the spot diameter of laser beam LB is sufficiently reduced, and laser beam LB is radiated to a center position of step 15 as seen widthwise (i.e., a center position of step 15 shown in FIG. 8 and FIG. 9, as seen in a horizontal direction).

For example, with reference to FIG. 8 and FIG. 9, when step 15 is formed to have a width W of 1.0 mm, laser beam LB has an irradiation position set to a position distant from end surface 15b of step 15 and side surface opening 14 by a distance which is a half of width W of step 15, i.e., W/2=0.5 mm, and laser beam LB has a spot diameter adjusted to be several tens micrometers or more and 1.0 mm or less for example.

Accordingly, welded portion WP is located on the boundary of overlapping region OR of body cover 10B and the portion of step surface 15a overlapping overlapping region OR, at a portion distant inward from end surface 10b of body cover 10B (see FIG. 8 and FIG. 9). In other words, outwardly of welded portion WP, there is located an unbonded boundary of overlapping region OR of body cover 10B and the portion of step surface 15a overlapping overlapping region OR.

Furthermore, welded portion WP is located on the boundary of overlapping region OR of body cover 10B and the portion of step surface 15a overlapping overlapping region OR, at a portion distant outward from side surface opening 14. In other words, inwardly of welded portion WP, there is located an unbonded boundary of overlapping region OR of body cover 10B and the portion of step surface 15a overlapping overlapping region OR.

Note that, as shown in FIG. 8, of end surface 10b of body cover 10B, an end surface 10b1 located closer to the front surface of photoelectric sensor 1 abuts against end surface 15b of step 15 of body case 10A. In contrast, as shown in FIG. 9, of end surface 10b of body cover 10B, an end surface 10b2 located closer to the rear surface of photoelectric sensor 1 does not abut against end surface 15b of step 15 of body case 10A, and a gap G of a prescribed size is formed.

Furthermore, although not shown herein, with reference to FIG. 6, of end surface 10b of body cover 10B, an end surface 10b3 located closer to the lower surface of photoelectric sensor 1 abuts against end surface 15b of step 15 of body case 10A, and an end surface 10b4 located closer to the upper surface of photoelectric sensor 1 and an end surface 10b5 closer to a lower and rear surface of photoelectric sensor 1 (i.e., an end surface located in a vicinity of a connection portion of cable 50) do not abut against end surface 15b of step 15 of body case 10A and a gap of a prescribed size is formed (FIG. 6 also does not show for the sake of scaling whether the end surfaces are in contact with each other or not).

This is based on a result of having aligned body cover 10B with body case 10A by using corner C1 of step 15 and corner C2 of body cover 10B. Hereinafter, this point will be described more specifically together with a method of producing photoelectric sensor 1 in the present embodiment.

In the present embodiment, casing 10 of photoelectric sensor 1 is assembled through a process as follows: initially, various internal components are accommodated inside body case 10A.

Subsequently, body cover 10B is disposed on body case 10A such that side surface opening 14 of body case 10A is covered and the outer peripheral portion of body cover 10B overlaps step surface 15a of step 15 located at the peripheral edge of side surface opening 14. In doing so, body cover 10B is fitted to step 15 of body case 10A and subsequently, body cover 10B is moved on step 15 frontward and downward to thus match corner C2 of body cover 10B to corner C1 of step 15.

Thus, at two adjacent sides of step 15 generally in the form of a pentagon larger in shape than body cover 10B in a plan view (i.e., a frontward side and a downward side connected by corner C1), end surfaces 10b1 and 10b3 of body cover 10B each abut against end surface 15b of step 15 to thus position body cover 10B relative to body case 10A. Note that, accordingly, at three sides other than the above two sides, gap G is formed as described above.

Subsequently, of the boundary of overlapping region OR of body cover 10B and a portion of step surface 15a of step 15 overlapping overlapping region OR, a portion distant inward from end surface 10b of body cover 10B (10b1-10b5) is scanned by and thus irradiated with laser beam LB along side surface opening 14 to provide welded portion WP which bonds body case 10A and body cover 10B together such that welded portion WP surrounds side surface opening 14.

Thus, body cover 10B is fixed to body case 10A, and photoelectric sensor 1 in the above described present embodiment is thus produced.

In photoelectric sensor 1 thus produced, without the necessity of severely managing body case 10A and body cover 10B in precision as parts, and without the necessity of severely managing a laser irradiation condition more than necessary in laser-welding, a width of step 15 can be set to an appropriate size with a tolerance of body case 10A and body cover 10B considered and a position on step 15 closer to a center thereof as seen widthwise (e.g., a center position as indicated above as an example) can be set as an irradiation position of laser beam LB to suppress poor welding in laser-welding (e.g., insufficient sealing resulting from an unwelded portion, a positionally displaced welded portion, etc.).

Furthermore, since the spot diameter of laser beam LB can be sufficiently made small, not only can what has smaller power be used as laser equipment but heat generated in laser-welding can also be significantly reduced, and accordingly, a rise in temperature of the casing can be sufficiently suppressed and as a result a possibility of having an adverse effect on internal components of resin or rubber represented by lens member 20, transmissive plate 24, various brackets 41-43, O rings 91 and 92, etc. described above can be reduced.

Thus photoelectric sensor 1 in the present embodiment can reduce a production cost more than conventional and also ensures that body case 10A and body cover 10B are bonded together.

Note that photoelectric sensor 1 of the above configuration allows laser beam B to have a sufficiently small spot diameter and hence allows welded portion WP to have a reduced area, and as a result also allows the casing to have an aesthetically improved external appearance. Furthermore, by providing welded portion WP, a rugged surface caused on an external surface of casing 10 can be reduced, so that when photoelectric sensor 1 is used in the fields of foods, machine tools and the like, welded portion WP can be prevented from being smeared and improvement in a sanitary aspect is also attained.

While in the embodiment of the present invention described above a case has been described by way of example in which welded portion WP is provided on a boundary of overlapping region OR of body cover 10B and a portion of step surface 15a overlapping overlapping region OR, at a portion distant outward from side surface opening 14, welded portion WP is not necessarily provided to be distant from side surface opening 14 and may be provided up to a portion adjacent to side surface opening 14. However, in order to reduce an adverse effect on the internal components, it is preferable to provide welded portion WP to be distant from the internal components as much as possible, however, depending on the case, casing 10 between welded portion WP and the internal components may be increased in thickness or the like and hence in thermal capacity to suppress the above described thermal effect.

Furthermore, while in the embodiment of the present invention described above a case has been described by way of example in particular in which a position irradiated with laser beam LB is set at a center position on step 15 as seen widthwise, this is not a requirement and any position on step 15 that is close to the center thereof as seen widthwise may be set as the irradiation position of laser beam LB.

Furthermore, while in the embodiment of the present invention described above a case has been described by way of example which is configured such that body case 10A is provided with step 15 and body cover 10B is fitted to step 15, step 15 is not necessarily provided and the present invention is of course applicable to a configuration in which side surface opening 14 is alone simply provided. In that case, of the various effects described above, an effect other than an effect obtained by providing step 15 is obtained. Furthermore, casing 10 can be miniaturized by the absence of step 15, and in laser-welding, pressing body cover 10B only toward body case 10A suffices, and doing so is also better in operability.

Furthermore, while in the embodiment of the present invention described above a case has been described by way of example in which an opening for assembling various internal components to an interior of body case 10A is provided through a left side surface of body case 10A, the position of the opening is of course not limited. Furthermore, it is not necessary, either, to apply the present invention to an opening for assembling various internal components to an interior of body case 10A, and the present invention may be applied to closing an opening provided for another usage (e.g., an opening for assembling a transmissive plate and a display and operation unit to the casing, etc.).

Furthermore, while in the embodiment of the present invention described above a case has been described by way of example in which the present invention is applied to a reflection type photoelectric sensor, the present invention is not limited thereto in to what it is applied, and the present invention is of course also applicable to a photoelectric sensor in a different form, a sensor device other than the photoelectric sensor and the like.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. A sensor device comprising:
   a body case provided with an opening; and
   a body cover assembled to the body case to cover the opening,
   the body cover having at an outer peripheral portion thereof an overlapping region overlapping a portion of the body case located at a peripheral edge of the opening,
   the body cover being fixed to the body case by providing a welded portion surrounding the opening using laser-welding at a portion distant from an end surface of the body cover in a boundary of the overlapping region of the body cover and a portion of the body case overlapping the overlapping region,
   wherein a step is provided at the portion of the body case located at the peripheral edge of the opening and the body cover is fitted to the step, and
   wherein:
   when the opening is observed in a direction along a normal to its opening plane, the step has an outer shape of a polygon larger than a shape of the body cover; and
   at two adjacent sides of the step having the outer shape of the polygon, an end surface of the step abuts against the end surface of the body cover.

2. The sensor device according to claim 1, wherein the welded portion is provided at a portion distant outward from the opening in the boundary of the overlapping region of the body cover and the portion of the body case overlapping the overlapping region.

3. A method of producing a sensor device, comprising:
   disposing a body cover on a body case to cover an opening of the body case and also allow the body cover to have an outer peripheral portion overlapping a portion of the body case located at a peripheral edge of the opening; and
   fixing the body cover to the body case by providing a welded portion surrounding the opening so as to bond the body case and the body cover using laser-welding by way of scanning a laser beam along the opening to irradiate therewith a portion distant inward from an end surface of the body cover in a boundary of an overlapping region of the body cover overlapping the portion of the body case located at the peripheral edge of the opening and a portion of the body case overlapping the overlapping region,
   wherein in disposing the body cover on the body case, the body cover is fit to a step provided at the portion of the body case located at the peripheral edge of the opening, and
   wherein in disposing the body cover on the body case, when the opening is observed in a direction along a normal to its opening plane, at two adjacent sides of the step, which has an outer shape of a polygon larger than a shape of the body cover, an end surface of the body cover is abutted against an end surface of the step to position the body cover relative to the body case.

4. The method of producing a sensor device according to claim 3, wherein in fixing the body cover to the body case, the laser beam is scanned to thus irradiate therewith a portion distant outward from the opening in the boundary of the overlapping region of the body cover and the portion of the body case overlapping the overlapping region.

* * * * *